United States Statutory Invention Registration [19]

[11] Reg. Number: H357

Howland et al. [43] Published: Nov. 3, 1987

[54] ELECTROMAGNETIC PROJECTILE LAUNCHERS

[75] Inventors: H. Richard Howland; George A. Kemeny, both of Pittsburgh, Pa.

[73] Assignee: The United States of America as represented by the Secretary of the Army, Washington, D.C.

[21] Appl. No.: 911,195

[22] Filed: Sep. 4, 1986

Related U.S. Application Data

[63] Continuation of Ser. No. 733,342, May 13, 1985.

[51] Int. Cl.[4] ..... F41F 1/02

[52] U.S. Cl. ..... 89/8; 124/3; 310/12

*Primary Examiner*—Harvey E. Behrend
*Assistant Examiner*—John E. Griffiths
*Attorney, Agent, or Firm*—Anthony T. Lane; Harold H. Card, Jr.; Michael C. Sachs

[57] ABSTRACT

These electromagnetic guns or launchers comprise a pair of switching rails with a slidable switching armature associated therewith for commutating a high direct current into a pair of projectile rails which are arranged in tandem with the switching rails and are electrically connected thereto. The kinetic energy of the switching armature is transferred to the projectile armature assembly so that the projectile armature assembly has an initial velocity as the current is commutated to the projectile rails. The projectile armature assembly may be mounted on and carried by the switching armature during its entire travel or the switching armature may bump the projectile armature assembly into the conductive breech region of the projectile rails at the end of its travel.

9 Claims, 5 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FIG. 1
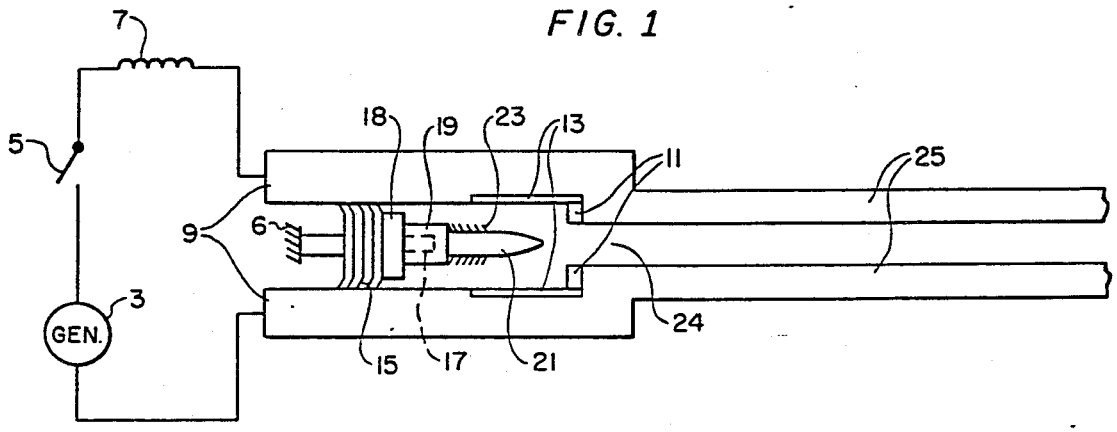
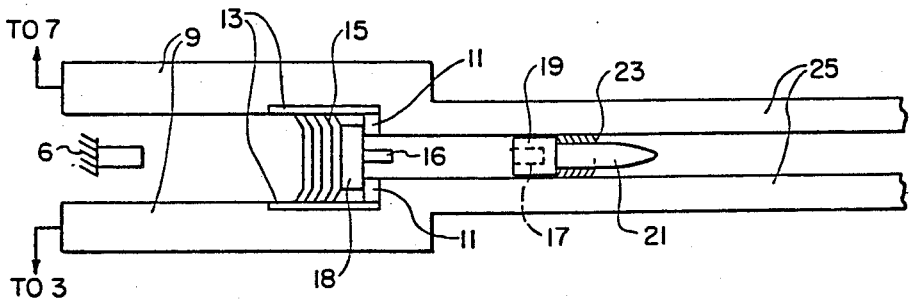
FIG. 2

ELECTROMAGNETIC PROJECTILE LAUNCHERS

The Government has rights in this invention pursuant to Contract DAAK10-79-V-0110, awarded by the Department of the Army.

This application is a continuation of application Ser. No. 733,242, filed May 13, 1985.

BACKGROUND OF THE INVENTION

This invention relates to electromagnetic guns or projectile launchers. Conventional firearms are limited in muzzle velocity by the velocity of expansion of the propellant gases. Many prior art techniques have been used to achieve muzzle velocities approaching the limit dictated by the aforementioned velocity of expansion. These techniques have included the use of oversized barrels with a small projectile carried by a sabot down a long barrel. The use of lighter propellant gases with inherently higher expansion velocities has also been used, however powder charges capable of producing such gases are expensive and difficult to use.

Complex multiple state firearms have been developed to increase muzzle velocity. An example is shown in U.S. Pat. No. 4,057,002, issued on Nov. 8, 1977. This two stage gun includes a barrel which is mounted on a piston which is accelerated forward within a cylinder by means of a first propellant charge. When the barrel reaches a high velocity, a conventional cartridge chambered therein is fired automatically by the expanding gases of the first propellant. This results in a high muzzle velocity since the barrel velocity and the projectile velocity within the moving barrel are additive.

High muzzle velocities result in longer range and also higher target impact velocity which greatly enhances a projectile's terminal effectiveness.

Electromagnetic projectile launchers are not subject to the muzzle velocity limitation of conventional firearms and can achieve muzzle velocities of thousands of meters per second. Such devices are also known as electric guns, parallel rail launchers or rail guns. In such projectile launchers the projectile is usually mounted on a conductive armature which is adapted to slide between a pair of parallel projectile or launching rails. A very high direct current is injected into the rails so that the current passes through the projectile armature. The resulting electromagnetic field drives the projectile armature down the rails at high speed. The high direct current is commutated into the projectile rails by means of a rail switch which is connected in series with a charging inductor through which a high direct current is flowing. The rail switch shorts or bridges the projectile rails before firing so that when the rail switch is opened the high direct current is applied to the projectile rails and to the projectile armature assembly. The rail switch may comprise a second rail gun comprising a pair of parallel switching rails with a moveable switching armature slidably mounted therebetween.

In the prior art, projectile armatures have been positioned at the breech end of the projectile rails while the inductive energy storage device was charging and while the rail switch was operating to commutate the high accelerating current into the projectile rails. This arrangement permitted parasitic currents to flow through the projectile armature prior to and during the opening of the rail switch. This resulted in undesired heating of the projectile armature and/or movement thereof. Also, when commutation took place, the resulting high projectile armature currents coupled with the low initial speed of this armature sometimes resulted in welding of the armature to the projectile rails, or damage to the rails caused by this heating.

One prior art solution to this problem is shown in U.S. Pat. No. 4,369,691, issued on Jan. 25, 1983. In this patent, the breech area of the projectile rails includes a resistive insert which is contacted by the stationary projectile armature before firing and during charging of the inductive energy storage device. Thus premature excessive heating and projectile armature welding problems are obviated since the parasitic currents are reduced by the resistive inserts, however this apparatus results in reduce initial acceleration while the projectile armature remains within the resistive inserts, and this reduces the efficiency of energy transfer to the moving projectile armature.

The present invention overcomes the aforementioned disadvantages in a novel manner so that energy transfer to the projectile armature is maximized and the kinetic energy of the switching armature is utilized to accelerate the projectile armature.

SUMMARY OF THE INVENTION

The invention comprises an electromagnetic projectile launching system comprising a pair of parallel switching rails with a slidable switching armature associated therewith, a pair of projectile rails arranged parallel to said switching rails and electrically connected thereto. The projectile armature assembly is located aft of the projectile rail breech prior to and during charging of the inductor energy store and the switching armature is arranged to insert the projectile armature assembly into the projectile rail breech just as the switching armature breaks contact with its rails and the high accelerating current is switched into the projectile rails. The projectile rails may be co-linear with the switching rails or offset therefrom. The projectile armature assembly may be carried by the switching armature during its entire travel or the projectile armature assembly may be bumped into the conductive area of projectile rail breech at the end of the travel of the switching armature.

It is thus an object of this invention to provide an improved rail gun in which the kinetic energy of the switching armature is used to insert the projectile armature assembly into the projectile rail breech with an initial velocity just as the accelerating current is commutated into the projectile rails.

Another object of the invention is to provide a rail gun comprising a pair of switching rails and a pair of projectile rails arranged in tandem but not necessarily co-linearly, in which the switching armature carries the projectile armature assembly with it during its entire travel between said switching rails and at the end of its travel the said switching armature is brought to a stop while the projectile armature assembly continues and is inserted into the breech end of the said projectile rails just as the accelerating current is applied thereto through the commutating action of the said switching armature.

A still further object of the invention is to provide an electromagnetic projectile launcher comprising a pair of switching rails and a pair of projectile rails arranged co-linearly, and in which the projectile armature assembly is located in an insulated breech area of said projectile rails prior to the firing of said launcher, said insulated breech area comprising an electrically insulated section of said projectile rails, said projectile armature assembly comprising an anvil at the aft end thereof and the switching armature comprising another anvil adapted to contact said first anvil to bump said projectile armature assembly out of said insulated breech area into the conductive breech area of said projectile rails.

A further object of the invention is to provide a rail gun of the type including a switching rail system and a projectile rail system in which the motion of the switching armature by mechanical or pneumatic means directly results in the insertion of the projectile armature assembly into the projectile rail breech, thus eliminating parasitic current flow through the projectile armature, imparting initial kinetic energy to the projectile armature assembly, and achieving precise commutation of accelerating current to the projectile rails to yield maximum efficiency and projectile velocity.

These and other objects and advantages of the invention will become apparent from the following detailed description and the drawings.

BRIEF DESCRIPTION OF THE DRAWINGS

FIGS. 1 and 2 are top views of a rail gun according to the invention in which the projectile rails are co-linear extensions of the switching rails.

DETAILED DESCRIPTION OF PREFERRED EMBODIMENTS

Figure 3:
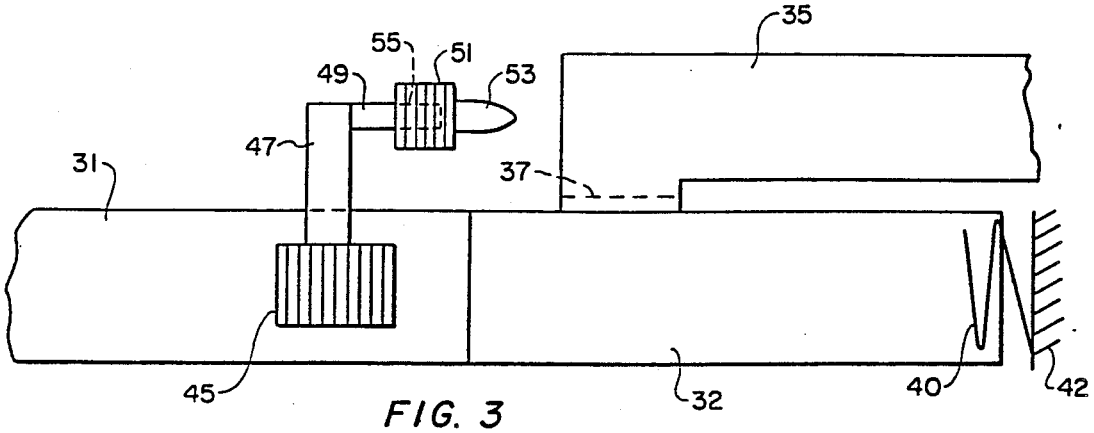
FIGS. 3 and 4 are side and top views, respectively, of another embodiment of the invention wherein the two pairs of rails are in tandem and in parallel with each other but are offset from each other.

FIGS. 1 and 2 shows a rail gun including a pair of switching rails 9 and a pair of launching or projectile rails 25, which are co-linear extensions of the switching rails. Both sets of rails comprise parallel, flat conductors, with the spacing between projectile rails being less than that of the switching rails. In operation, the electromagnetic forces caused by the extremely high rail currents, which can be over one million amperes, tend to spread the rails apart and the rails must be braced to resist these forces. The source of the high accelerating direct current can be a homopolar generator 3, which comprises a rotating disc or drum which moves in a magnetic field. The generator is mechanically driven by a prime mover (not shown) which may comprise an electric motor. The inductor 7 is an energy storage device which is charged by the output of generator 3 and is rapidly discharged through the rails to produce the high accelerating current. Prior to firing, the switching armature 15 is located near the left end of the switching rails 9 and is held in place by a restraining device schematically indicated at 6, as shown in FIG. 1. The switching armature comprises a stack of conductive laminations which electrically bridge the conductive rails 9. In the embodiment of FIGS. 1 and 2 the projectile armature assembly comprising the projectile armature 23, the mounting block 19 and the projectile 21 are detachably mounted on the forward end of the switching armature. The rod 16 on the switching armature 15 engages mating hole 17 in the mounting block 19. The projectile armature 23 also comprises metal laminations adapted to bridge the projectile rails. The right or muzzle end of the switching rails comprise insulated inserts 13.

FIG. 1 shows the rail gun ready for firing. To initiate the firing sequence the generator 3 is revved up by its prime mover, the make switch 5 is closed to charge up inductor 7 through the stationary switching armature 15 which is bridging the switching rails. When the inductor is fully charged and it is desired to fire the gun, the latch or restraining device 6 is released. This permits the switching armature and the projectile armature assembly mounted thereon to slide to the right down the switching rails. When the trailing edge of the switching armature passes the left edge of the insulated inserts 13, the series circuit comprising the generator 3, switch 5 and the inductor 7 will open. The resultant decrease in the magnetic field of the inductor will produce extremely high voltage and current which will be applied to both pairs of rails, since they are electrically connected. This commutation of current will also produce arcs at the trailing edges of the switching armature. The apparatus is designed so that, just as the switching armature opens the circuit to produce the high rail accelerating current, the projectile armature assembly is inserted into the breech area of the projectile rails, at the left end thereof, indicated by reference numeral 24. Thus the projectile armature assembly will have an initial velocity approximately equal to the terminal velocity of the switching armature. The muzzle or right end of the switching rails comprise a pair of resilient energy absorbers 11, which engage shoulder 18 on the switching armature to stop its forward motion. The projectile armature assembly is then free to continue its travel into the breech 24 and then down the projectile rails 25 to the muzzle at the right end thereof.

FIG. 2 is also a top view of the same rail gun, showing the positions of the two armatures after the commutation of the accelerating current to the projectile rails, and with the switching armature stationary against the energy absorbers 11. and the projectile 21, its armature 23 and the mounting block 19 being accelerated down the rails 25 toward the muzzle. The projectile armature is analogous to a sabot of a conventional firearm and it can be separated from the projectile after muzzle exit, just as a sabot would be.

Figure 4:
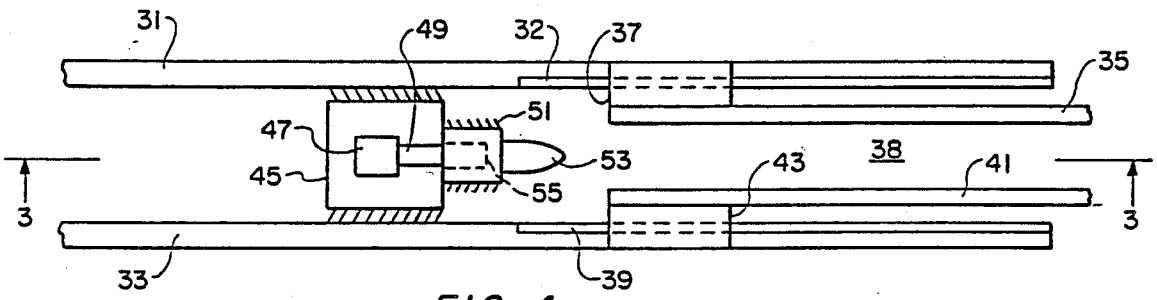

In the alternate embodiment of FIGS. 3 and 4 the projectile rails 35 and 41 are in tandem with and parallel to the switching rails 31 and 33, but are offset therefrom. Thus the two sets of rails are not co-linear. In this embodiment the projectile armature assembly is carried piggy-back fashion above and slightly forward of the switching armature. The projectile armature assembly is above the switching armature by the same distance that the projectile rails are offset from the switching rails and thus the projectile armature assembly moves along a path co-linear with the projectile rails during movement of the switching armature and is inserted into the projectile rail breech just as the switching armature commutates the accelerating current into the projectile rails. The projectile armature assembly can be mounted on and pushed along by a rod on the switching armature just as in the embodiment of FIGS. 1 and 2, except that the rod is mounted on a pylon mounted atop the switching armature. The advantage of this offset arrangement of the two pairs of rails is that it makes it easier to re-load the weapon since the switching armature can be easily removed from the dead end of the switching rails. Further, the underside of the switching rails at the muzzle end thereof can be left open so that after the switching armature commutates the current and launches the projectile armature assembly, the switching armature will be brought to a stop and will fall out of the open underside of its rails, ready to be manually or automatically re-inserted for another firing of the rail gun.

FIG. 3 is a side view from between the two pairs of rails, showing the left hand switching rail 31 and the parallel but offset left projectile rail 35 arranged slightly above the switching rail. FIG. 4 is a top view of this embodiment showing the switching rails 31 and 33 and the projectile rails 35 and 41 with a reduced spacing. Horizontal conductive sections 37 and 43 serve to support the projectile rails and to electrically connect left switching rail 31 to the left projectile rail 35, and right switching rail 33 to right projectile rail 41, respectively. The two insulated inserts 32 and 39 at the right ends of the switching rails serve the same purpose as the inserts 13 in the embodiment of FIGS. 1 and 2

In FIGS. 3 and 4 the switching armature 45 is shown during its travel down the switching rails while it has mounted thereon the projectile armature assembly comprising projectile 53 and projectile armature 51. The switching armature 45 has an upstanding pylon 47 atop thereof with a horizontal rod 49 projecting forward of the top of the pylon. The rod 49 engages a mating hole 55 in the aft end of the projectile armature 55, so that the projectile armature assembly is pushed along slightly forward of the switching armature. When the trailing edges of the switching armature 45 pass the left edge of the electrically insulating inserts 32 and 39, the rail switch circuit is broken and the commutation to the projectile rails initiated. At this time the projectile armature assembly is just entering the projectile rail breech and as soon as the projectile armature bridges the projectile rails and the current commutation occurs, the projectile armature assembly will be rapidly further accelerated toward the gun's muzzle without the disadvantages of the prior art apparatus discussed above. The length of the rod 49 and the position of the left edges of the inserts 32 and 39 as well as the position of the projectile rail breech relative to each other are selected to yield optimum operation, maximum efficiency, minimum wear on mechanical and electrical parts and maximum muzzle velocity. Optimum design would depend on the duration of the arc formed by the switching armature as it breaks its circuit across the switching rails and this time duration would in turn depend on what type, if any, anti-arcing devices were attached to the aft end of the switching armature. Full commutation of the current into the projectile rails is not accomplished until arcing between the switching rails and the switching armature ceases.

The muzzle or right end of the switching rails may be provided with an energy absorbing means such as spring 40 anchored to wall 42. This spring can be used to bounce the switching armature and its pylon 47 back toward the breech or left end of the switching rails, so that it is ready for the next firing of the rail gun. Alternatively, the muzzle end of the switching rails in the area referenced as 38 can be left open so that the switching armature and the parts attached thereto will fall down into a suitable container or onto a conveyer or chute which will carry this armature back toward the breech end of the switching rails so that it can be re-inserted therein and loaded with another projectile armature assembly.

Figure 5:
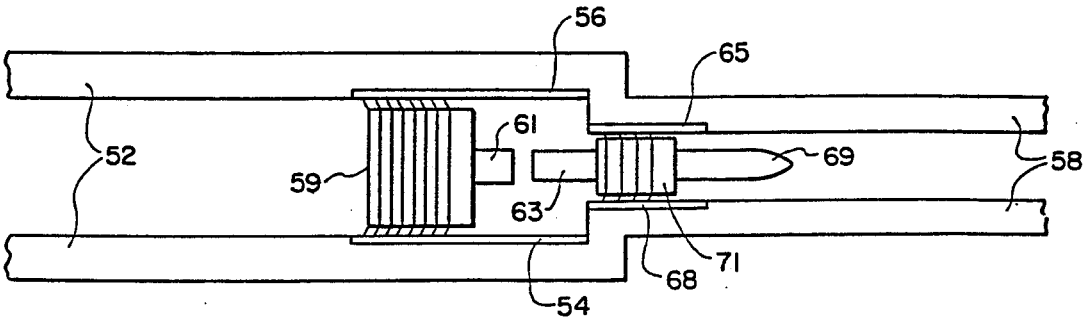
FIG. 5 is an embodiment wherein the switching armature bump the projectile armature at the end of its travel.

The embodiment of FIG. 5 comprises switching rails 52 and projectile rails 58, arranged co-linearly as in FIGS. 1 and 2. The top view of FIG. 5 shows the switching armature 59 travelling along its rails toward the stationary projectile armature assembly which has been positioned in the insulated breech area of its rails 58 between the insulated or resistive inserts 65 and 68. The insulated inserts 54 and 56 in the switching rails open the rail switch when the trailing edges of the switching armature 59 reaches them, thus initiating the commutation of the current to the projectile rails. The forward end of the switching armature has an anvil 61 attached thereto which is lined up with a mating anvil 63 on the aft end of the projectile armature 71. Thus the switching armature will bump the projectile armature assembly forward into the conductive breech area of the projectile rails to the right of inserts 65 and 68, just as the current is being commutated, thus transferring the kinetic energy of the switching armature to the projectile armature assembly. The resistive or insulating inserts 65 and 68 prevent or reduce parasitic currents from flowing across the projectile armature 71 prior to and during commutation. The apparatus is designed so that when the projectile armature 71 and the projectile 69 leaves the area of the resistive or insulated inserts 65 and 68, the accelerating current will be fully commutated into the projectile rails so that further acceleration of the projectile armature assembly can proceed.

In accordance with the principles of the conservation of momentum, the collision or bumping of the projectile armature assembly can result in a higher velocity for the bumped assembly than the velocity of the switching armature at impact, provided that the weight of the switching armature is greater than that of the projectile armature assembly, and the oollision is perfectly elastic, or nearly so.

Instead of having metallic parts collide with each other to achieve bumping of the projectile armature assembly into the metallic breech area of its rails, pneumatic means may be used. For example, the area between the right or muzzle end of the switching rails 52 of FIG. 5 may be rendered air or gas-tight and this volume filled with a suitable gas, which may be air. Motion of the switching armature will then compress the gas which will then pneumatically initiate movement of the projectile armature assembly.

This invention has been described in connection with electromagnetic rail launching systems which all include a switching armature which is electromagnetically accelerated by the energy stored in the inductor which also accelerates the payload projectile. However, the concept of inserting the projectile armature assembly into the projectile rail breech which an initial velocity just as the accelerating current is commutated to the projectile rails is also applicable to systems wherein the rail switch (or the switching armature) is operated by other means such as magnetic, hydraulic, explosive, impact, spring means, or an electric motor. U.S. Pat. No. 4,433,607, issued on Feb. 28, 1984 discloses switches for very high currents which can be used with rail guns, and in which the projectile is given an ititial velocity by means of, for example an external source of compressed gas, as shown in FIG. 10 of that patent, or by means of a mechanically rotated wheel with the projectiles mounted thereon, as shown in FIG. 12 of the same patent. Those projectiles are accelerated by a moving arc and have no conductive armature attached thereto as do the projectiles of the present invention. The purpose of providing initial acceleration in the cited patent is to bring the projectile up to the speed of the moving arc which propels it down the launching rails.

While the invention has been described in connection with illustrative embodiments, obvious variations therein will be apparent to those skilled in the art, accordingly the invention should be limited only by the scope of the appended claims.

What is claimed is:

1. An electromagnetic projectile launching system comprising a pair of parallel switching rails with a slidable switching armature associated therewith, a pair of parallel projectile rails arranged in tandem with and parallel to said switching rails and electrically connected thereto, said projectile rails comprising a conductive breech area, said switching rails comprising insulated inserts at the muzzle end thereof, means to electromagnetically accelerate said switching armature down said switching rails toward said muzzle end of said switching rails to thereby commutate a high accelerating current into said projectile rails, a projectile armature assembly adapted to slide between said projectile rails, said projectile armature assembly comprising a projectile and a projectile armature, said projectile armature assembly being located aft of the conductive area of the breech of said projectile rails during the said acceleration of said switching armature, and enters the conductive area of the breech of said projectile rails after the switching armature is electromagnetically accelerated by said switching rails.

2. The system of claim 1 wherein said projectile armature assembly is located between a pair of insulating inserts in the breech area of said projectile rails during the travel of said switching armature along said switching rails, and wherein said switching armature bumps said projectile armature assembly into said conductive breech area of said projectile rails at the end of its travel.

3. The system of claim 1 wherein said projectile armature assembly is mounted on and carried by said switching armature during its entire travel down said switching rails, and said projectile armature assembly continues its movement into the said breech area of said projectile rails after said switching armature is brought to a stop.

4. The system of claim 3 wherein said projectile rails are offset from said switching rails and said projectile armature assembly is mounted on a pylon which is mounted atop said switching armature.

5. The system of claim 3 wherein said projectile rails are co-linear extensions of said switching rails and said projectile armature assembly is mounted forward of said switching armature by means of a rod and a mating hole.

6. An electric rail gun comprising a pair of switching rails with a slidable switching armature therebetween and a pair of projectile rails in tandem with said switching rails and electrically connected thereto, means to electromagnetically propel said switching armature down said switching rails toward said projectile rails, said rail gun further comprising a projectile armature assembly comprising a projectile armature adapted to slide between said projectile rails and a projectile, said projectile armature assembly being mounted on and carried by said switching armature during its entire travel down said switching rails, and means to insert said projectile armature assembly into the breech of said projectile rails as it leaves the space between said switching rails, the projectile armature thereafter commutating current to said projectile rails through electrical contact therewith.

7. The rail gun of claim 6 wherein said projectile rails are co-linear extensions of said switching rails.

8. The rail gun of claim 6 wherein said projectile rails are parallel to said switching rails but offset therefrom and wherein projectile armature assembly is mounted on a pylon which is attached to the top of said switching armature.

9. A rail gun comprising a pair of switching rails with a switching armature slidable between said rails, a pair of projectile which are co-linear extensions of said switching rails, means to electromagnetically propel said switching armature toward said projectile rails, the breech area of said projectile rails, comprising a pair of insulating inserts, a projectile armature assembly comprising a projectile armature with an anvil at the aft end thereof and a projectile, said projectile armature located within said inserts during the travel of said switching armature down said switching rails, said anvil arranged to bump said projectile armature assembly forward into the conductive region of said projectile rails at the end of its travel.

* * * * *